(12) United States Patent
Itoh et al.

(10) Patent No.: US 8,104,845 B2
(45) Date of Patent: Jan. 31, 2012

(54) VEHICLE BRAKING APPARATUS

(75) Inventors: Akihiro Itoh, Atsugi (JP); Hidetoshi Suzuki, Ebina (JP)

(73) Assignee: Nissan Motor Co., Ltd., Yokohama (JP)

( * ) Notice: Subject to any disclaimer, the term of this patent is extended or adjusted under 35 U.S.C. 154(b) by 764 days.

(21) Appl. No.: 11/682,055

(22) Filed: Mar. 5, 2007

(65) Prior Publication Data
US 2007/0210641 A1  Sep. 13, 2007

(30) Foreign Application Priority Data

Mar. 10, 2006 (JP) ................................. 2006-066187
Nov. 22, 2006 (JP) ................................. 2006-315935

(51) Int. Cl.
*B60T 8/48* (2006.01)
(52) U.S. Cl. ....................................................... 303/191
(58) Field of Classification Search ................ 303/3, 10, 303/11, 191
See application file for complete search history.

(56) References Cited

U.S. PATENT DOCUMENTS

| | | | | |
|---|---|---|---|---|
| 6,189,986 | B1 * | 2/2001 | Shimizu et al. | ............... 303/155 |
| 6,783,195 | B1 * | 8/2004 | Grabsch | ............... 303/191 |
| 2004/0183366 | A1 | 9/2004 | Kamiya et al. | |
| 2004/0212246 | A1 | 10/2004 | Kamiya et al. | |
| 2006/0202555 | A1 * | 9/2006 | Kingston et al. | ............... 303/191 |
| 2007/0216224 | A1 * | 9/2007 | Schmitt et al. | ............... 303/191 |

FOREIGN PATENT DOCUMENTS

| | | |
|---|---|---|
| DE | 10335616 A1 * | 3/2005 |
| EP | 0 982 207 A2 | 3/2000 |
| JP | 09-086375 | 3/1997 |
| JP | H11-301434 A | 11/1999 |
| JP | 2000-001162 | 1/2000 |
| JP | 2000-159094 | 6/2000 |
| JP | 2000-203401 A | 7/2000 |
| JP | 2005-289290 A | 10/2005 |
| JP | 2005-343377 A | 12/2005 |
| JP | 2006329154 A * | 12/2006 |

OTHER PUBLICATIONS

The Office Action of corresponding Japanese Application No. 2007-058400, dated Feb. 1, 2011.

* cited by examiner

*Primary Examiner* — Robert Siconolfi
*Assistant Examiner* — Stephen Bowes
(74) *Attorney, Agent, or Firm* — Global IP Counselors, LLP

(57) ABSTRACT

A vehicle braking apparatus is provided with a brake operating element that is operated by a driver, and an actuator that generates a braking force in accordance with a braking operation of the brake operating element. A controller is operatively arranged to control the actuator such that an increase in a rate of change of the braking force with respect to the braking operation by the driver is suppressed upon determining that vehicle cabin background noise is equal to or below a prescribed threshold value.

19 Claims, 9 Drawing Sheets

US 8,104,845 B2

VEHICLE BRAKING APPARATUS

CROSS-REFERENCE TO RELATED APPLICATIONS

This application claims priority to Japanese Patent Application Nos. 2006-066187, filed on Mar. 10, 2006 and 2006-315935, filed on Nov. 22, 2006. The entire disclosures of Japanese Patent Application Nos. 2006-066187 and 2006-315935 are hereby incorporated herein by reference.

BACKGROUND OF THE INVENTION

1. Field of the Invention

The present invention generally relates to a vehicle braking apparatus. More specifically, the present invention relates to a vehicle braking apparatus configured to apply a braking force delivered from a braking force generating section that is controlled based on operation of a brake pedal or other brake operating element.

2. Background Information

Basically, a conventional brake-by-wire braking apparatus operates a motor according to a depression amount of a brake pedal when a driver operates the brake pedal, and then controls the braking force corresponding to the depression of the brake pedal. Examples of such conventional braking apparatus technologies are disclosed in Japanese Laid-Open Patent Publication No. 2000-159094 and Japanese Laid-Open Patent Publication No. 2000-1162. These braking apparatuses include at least one brake cylinder (wheel cylinder), a pump configured to supply an operating hydraulic fluid to the brake cylinder and a motor configured to drive the pump. In particular, the brake cylinder (wheel cylinder) exerts a braking force against a wheel by applying hydraulic pressure delivered to the brake cylinder from the pump. The pump is driven by the motor to supply the operating hydraulic fluid to the brake cylinder at a hydraulic pressure corresponding to a target braking force. Thus, braking is accomplished by operating the motor in such a manner that the target braking force is obtained. The target braking force is calculated based on a master cylinder pressure generated in response to depression of the brake pedal. The master cylinder pressure corresponds to the depression amount (operation amount) of the brake pedal.

In view of the above, it will be apparent to those skilled in the art from this disclosure that there exists a need for an improved vehicle braking apparatus. This invention addresses this need in the art as well as other needs, which will become apparent to those skilled in the art from this disclosure.

SUMMARY OF THE INVENTION

It has been discovered that when operating the motor and the pump in a manner that is, for example, simply proportional to the operation amount of the pedal, there will be a possibility that the operating sound of the vehicle braking apparatus (e.g., the pump and/or motor) may disturb the driver when the brake pedal is operated while the vehicle is stopped or traveling slowly (i.e., low speed).

The present invention was conceived in view of this noise problem occurring in the vehicle cabin when the brake pedal is operated while the vehicle is stopped or traveling slowly (i.e., low speed). Thus, one object of the present invention is to provide a braking apparatus that can improve the comfort of the inside of the vehicle cabin when the brakes are operated.

In order to achieve the above mentioned object and other objects of the present invention, a vehicle braking apparatus is provided in accordance with a first aspect of the present invention that basically comprises a brake operating element, an actuator and a controller. The brake operating element is configured and arranged to be operated by a driver. The actuator is configured to generate a braking force in accordance with a braking operation of the brake operating element. The controller is operatively arranged to control the actuator such that an increase in a rate of change of the braking force with respect to the braking operation by the driver is suppressed upon determining that vehicle cabin background noise is equal to or below a prescribed threshold value.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
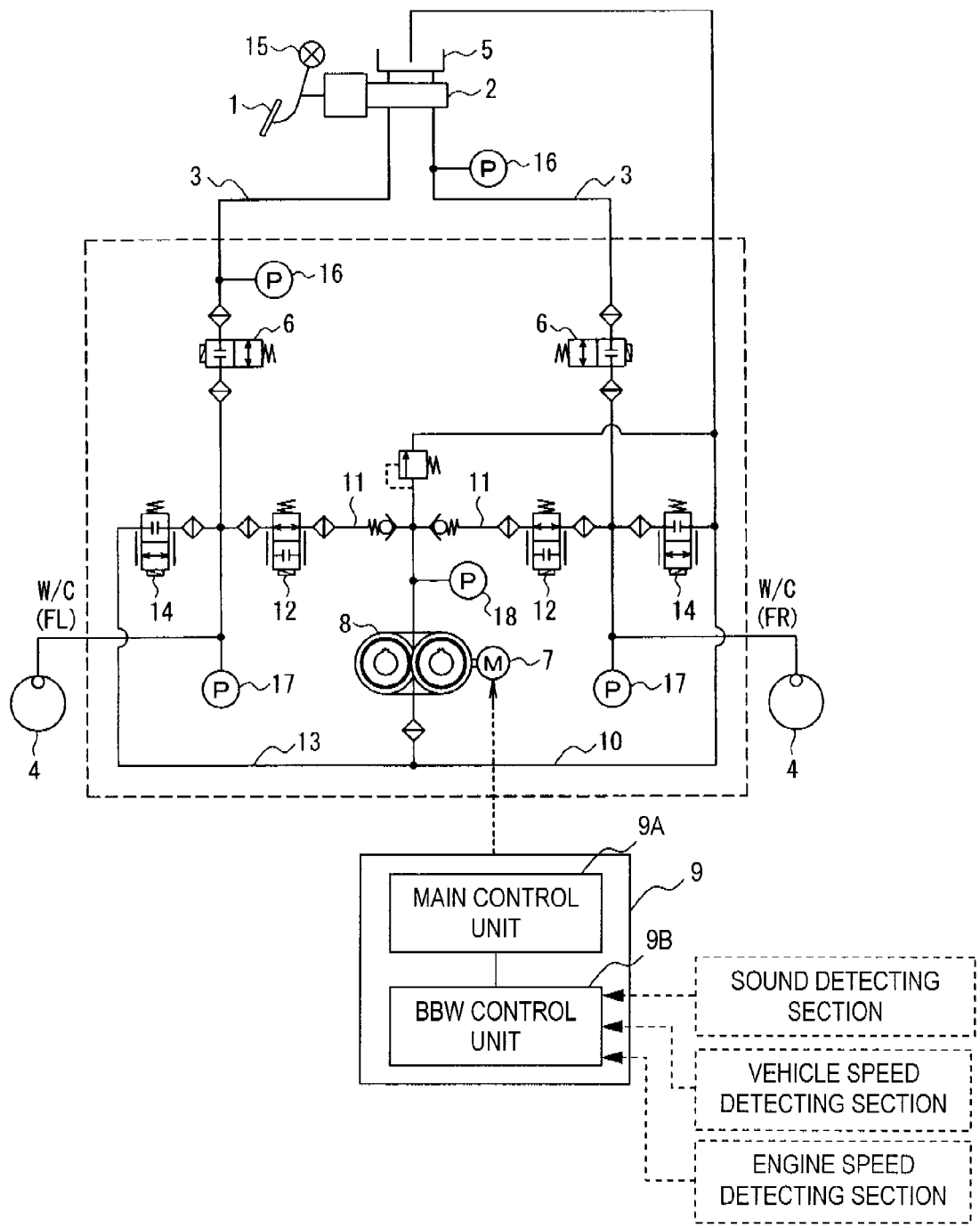
FIG. 1 is an overall schematic diagram of a hydraulic circuit and a control section forming a vehicle braking apparatus in accordance with one preferred embodiment of the present invention.

Referring initially to FIG. 1, a vehicle braking apparatus is illustrated in accordance with a preferred embodiment of the present invention. In FIG. 1, an overall hydraulic circuit diagram is illustrated. As seen in FIG. 1, the vehicle braking apparatus basically includes a brake pedal 1, a master cylinder 2, a pair of first communication passages 3, a pair of wheel cylinders 4, a reservoir 5, a pair of solenoid-operated shutoff valves 6, a motor 7, a hydraulic pump 8, a brake controller 9, a second communication passage 10, a pair of third communication passages 11, a pair of holding valves 12, a fourth communication passage 13, a pair of reduction valves 14, a stroke sensor 15, a pressure sensor 16, a pressure sensor 17 and a pressure sensor 18. Since the components and operations of the hydraulic circuit are relatively conventional, the components and operations of the hydraulic circuit will not be illustrated or discussed in detail.

The brake pedal 1 constitutes a brake operating element that is configured and arranged to be operated by a driver in order to brake the vehicle. The brake pedal 1 is operatively connected to the master cylinder 2 and a hydraulic pressure booster. The master cylinder 2 is connected to the wheel cylinders 4 through the first communication passages 3, respectively. The wheel cylinders 4 serves as brake cylinders. The solenoid-operated shutoff valves 6 are installed in the first communication passages 3, respectively. In FIG. 1, the solenoid-operated shutoff valves 6 are shown in the closed state, which they assume when they are energized. In this state, the connections between the master cylinder 2 and the wheel cylinders 4 are shut off. When the solenoid-operated shutoff valves 6 are not energized, they are in an open state and hydraulic pressure can be supplied from the master cylinder 2 to the wheel cylinders 4.

At least the motor 7 and the hydraulic pump 8 driven by the motor 7 constitute a braking force generating section or an actuator that is configured to generate a braking force during brake-by-wire control (also called BBW control). The operation of the motor 7 is controlled by a control signal (control current) from the brake controller 9. The rotary torque of the motor 7 serves to drive the hydraulic pump 8. FIG. 1 shows a gear pump as an example of the hydraulic pump 8. The intake port of the hydraulic pump 8 is connected to the reservoir 5 through the second communication passage 10. The discharge port is connected to the first communication passages 3 through the third communication passages 11. As a result, the hydraulic pump 8 can draw hydraulic fluid from the reservoir 5 through the second communication passage 10 and discharge hydraulic fluid to the wheel cylinders 4 through the third communication passages 11. The holding valves 12 are, for example, solenoid-operated proportional valves that are installed in the third communication passages 11. The wheel cylinders 4 are connected to the reservoir 5 via the second communication passage 10 (and the fourth communication passage 13.

During the BBW control, when the shutoff valves 6 are closed and the hydraulic pressure is to be increased, the holding valves 12 are opened and a pair of reduction valves 14 are closed such that hydraulic fluid discharged from the pump 8 is delivered to the wheel cylinders 4, thereby increasing the pressure. When the hydraulic pressure is to be decreased, the holding valves 12 are closed and the reduction valves 14 are opened such that the hydraulic fluid inside the wheel cylinders 4 returns to the reservoir 5.

The stroke sensor 15 is also provided to detect the operation amount of the brake pedal 1 and transmit the detected operation amount to the brake controller 9. The pressure sensor 16 detects the master cylinder pressure Pm (which corresponds to the braking force requested by the driver) and sends a signal indicating the detected pressure to the brake controller 9. The pressure sensor 17 detects the wheel cylinder pressure and sends a signal indicating the detected pressure to the brake controller 9. The pressure sensor 18 detects the discharge pressure of the pump 8 and sends a signal indicating the detected pressure to the brake controller 9.

The brake controller 9 preferably includes at least one microcomputer equipped with various timer functions and a brake control program that issues control signals to control the valves 6, 12 and 14 and the motor 7. The brake controller 9 also includes, for example, other conventional components such as an input interface circuit, an output interface circuit, and storage devices such as a ROM (Read Only Memory device) device and a RAM (Random Access Memory device) device. The memory device circuit stores processing results and control programs such as ones for the brake control operations that are used by the processor circuit. The control unit 30 is operatively coupled to the various components of the brake control apparatus in a conventional manner. The internal RAM of the brake controller 9 stores statuses of operational flags and various control data. The brake controller 9 is capable of selectively controlling any of the components of the control system in accordance with the control program. It will be apparent to those skilled in the art from this disclosure that the precise structure and algorithms for the brake controller 9 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

Preferably, the brake controller 9 can be considered to include a main control unit 9A and a BBW control unit 9B. The main control unit 9A is configured to issue control signals to the valves 6, 12 and 14 in accordance with the braking state. The BBW control unit 9B is configured to execute the BBW control. With the present invention, the rate at which the braking force changes with respect to a braking operation executed by the driver is reduced when the vehicle cabin background noise inside the vehicle cabin is equal to or below a prescribed threshold value due to the vehicle traveling speed or the engine rotational speed being low. As a result, the noise associated with operation of the braking force generating section during braking is reduced and the level of comfort inside the vehicle cabin can be improved.

The control processing executed by the BBW control unit 9B when the hydraulic pressure is increased will now be explained with reference to FIG. 2. The BBW control unit 9B executes the control sequence once per prescribed sampling cycle time. In step S10, the stroke amount S (operation amount) of the brake pedal 1 is received from the stroke sensor 15. Next, in step S20, the master cylinder pressure Pm is received from the pressure sensor 16. Then, the BBW control unit 9B proceeds to step S30.

In step S30, the BBW control unit 9B determines if a braking request exists. If a braking request exists, then the BBW control unit 9B proceeds to step S40. If a braking request does not exist, then the BBW control unit 9B ends the control sequence and returns. The determination as to whether or not there is a braking request can be accomplished using a known technology based on such factors as whether the stroke amount S is positive, whether the master cylinder pressure Pm is positive, or whether a brake switch is in an "on" state.

In step S40, the BBW control unit 9B computes a target braking force Fs (target deceleration) and proceeds to step S50. The target braking force Fs is computed by multiplying the master cylinder Pm by a prescribed gain K2 based on, for example, FIG. 3.

$$Fs=Gp=K2 \times Pm$$

Figure 4:
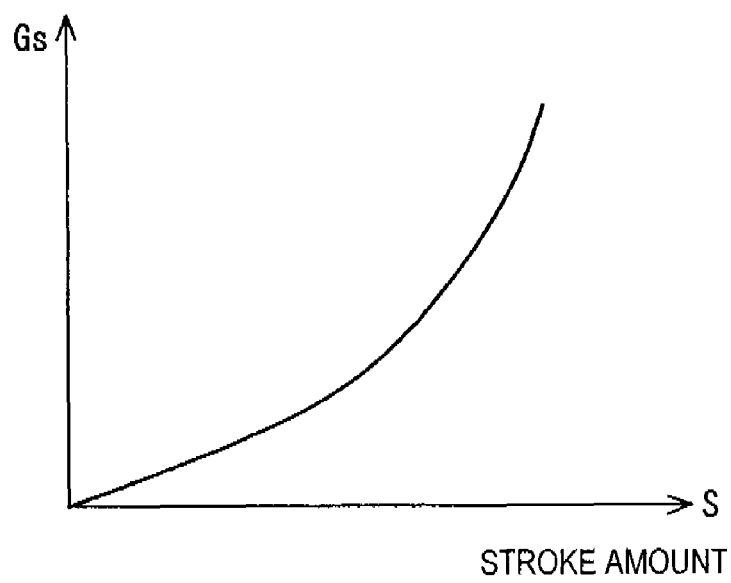
FIG. 4 is an exemplary graph for illustrating a relationship between the stroke amount and the target braking force (target deceleration) in accordance with the first embodiment of the present invention.

It is also possible to find the target braking force Fs=Gs based on the stroke amount S using a map like that shown in FIG. 4.

Figure 5:
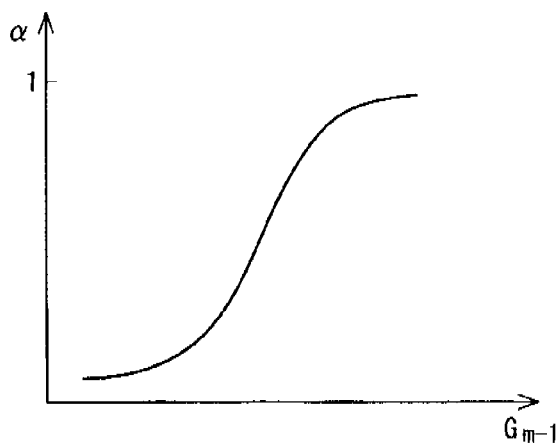
FIG. 5 is an exemplary graph for illustrating a relationship between the braking force (deceleration) and the contribution coefficient α.

It is also possible to calculate the target braking force Fs based on both the stroke amount S and the master cylinder pressure Pm. In such a case, the target braking force Fs can be calculated using the equation shown below, where a contribution coefficient $\alpha$ (<1) is set, for example, based on the target braking force of the previous control cycle such that the contribution coefficient $\alpha$ increases as the target braking force increases, as shown in FIG. 5.

$$Fs=G=(1-\alpha) \times Gs + \alpha Gp$$

The calculation methods presented here are merely examples. It is also acceptable to calculate the target braking force Fs using another calculation method.

In step S50, the BBW control unit 9B calculates the difference $\Delta F$ between the current braking force Fr and the target braking force Fs using the equation shown below and proceeds to step S60. The current braking force Fr is calculated by, for example, multiplying the wheel cylinder pressure by a prescribed gain.

$$\Delta F=Fs-Fr$$

In step S60, the BBW control unit 9B determines if the vehicle is stopped. If the vehicle is stopped, then the BBW control unit 9B proceeds to step S70. If not, then the BBW control unit 9B proceeds to step S110. Step S60 serves to determine estimate if the vehicle cabin background noise inside the vehicle cabin is equal to or below a prescribed threshold value, which is a value that is indicative of the background noise associated with a vehicle traveling at a speed just prior to stopping.

Figure 8:
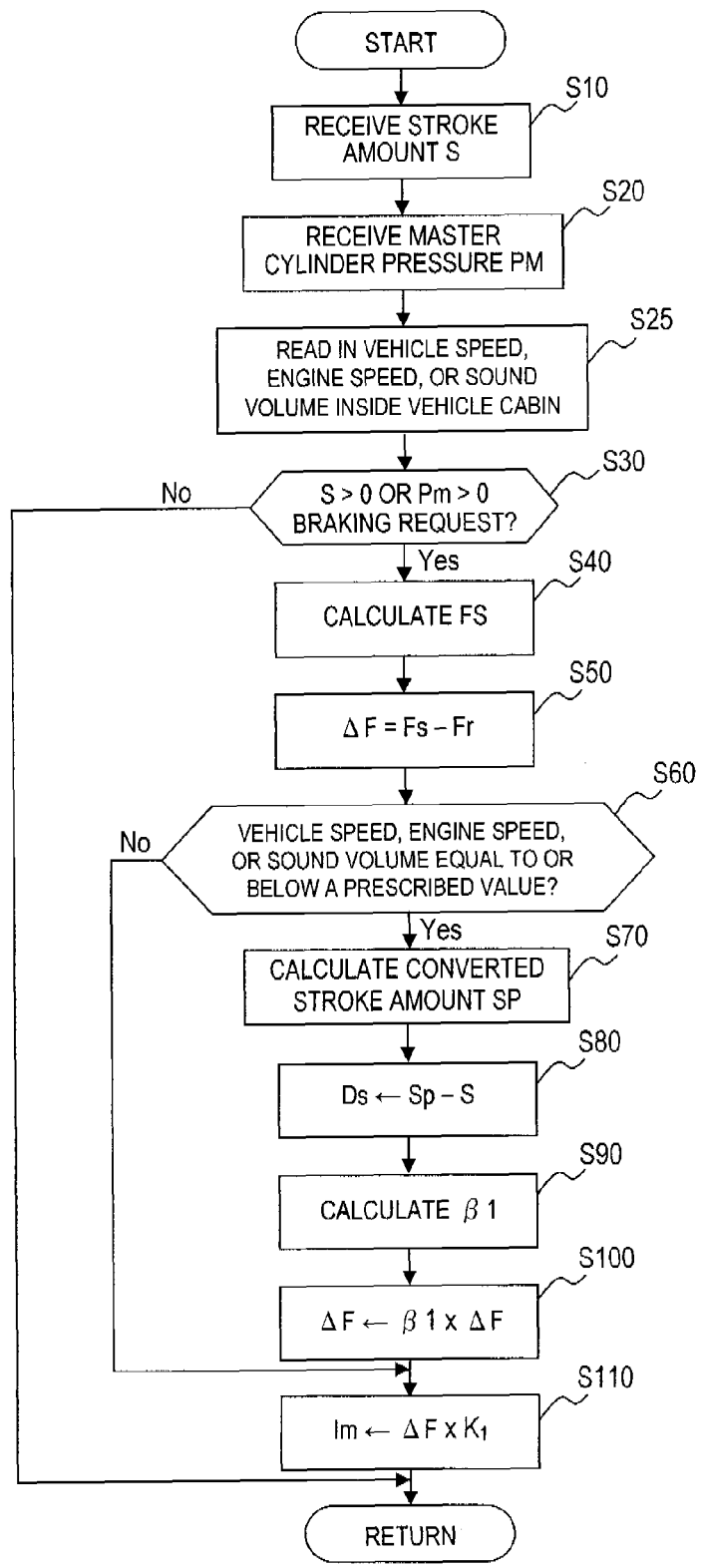
FIG. 8 is a flowchart of an alternative example a brake control process executed in the brake-by-wire (BBW) controller or control unit of the vehicle braking apparatus in accordance with the first embodiment of the present invention.

In order to estimate if the vehicle cabin background noise inside the vehicle cabin is equal to or below a prescribed threshold value in step S60, instead of detecting if the vehicle is stopped, it is also acceptable to use a signal from a vehicle traveling speed detecting device (indicated with broken line in FIG. 1) and/or a signal from an engine speed detecting device (indicated with broken line in FIG. 1). The vehicle traveling speed detecting device is used to determine if the vehicle traveling speed is equal to or below a prescribed threshold value (e.g., if the vehicle is moving as slow or slower than a speed corresponding to congested traffic or is on the verge of stopping), while the engine speed detecting device is used to determine if the rotational speed of the engine is equal to or below a prescribed rotational speed. Thus, the BBW control unit 9B (controller) is operatively arranged to control the braking force generating section or the actuator (e.g., the motor 7 and the hydraulic pump 8) such that an increase in a rate of change of the braking force will be suppressed upon determining a low vehicle traveling speed that is equal to or below a prescribed threshold value. It is also acceptable to install a microphone or other sound detecting device (indicated with broken line in FIG. 1) inside the cabin to detect, for example, sound in the vicinity of the passengers head and determine if the vehicle cabin background noise is equal to or below a prescribed threshold value based on the size of the detected sound. Thus, the BBW control unit 9B (controller) is operatively arranged to control the braking force generating section or the actuator (e.g., the motor 7 and the hydraulic pump 8) such that an increase in a rate of change of the braking force will be suppressed upon determining that vehicle cabin background noise is equal to or below a prescribed threshold value. FIG. 8 is a flowchart showing the control sequence executed when a sound detecting device is used. In step S25 of this control sequence, the vehicle speed, the engine speed, and/or the sound volume inside the vehicle cabin is detected to be used in step S60.

The vehicle cabin background noise is defined to be sounds reaching the inside of the vehicle cabin from outside the vehicle cabin. Examples include road noise, engine noise, and operating noise of the air conditioning system.

In step S70, the BBW control unit 9B calculates a converted stroke amount Sp corresponding to the actual master cylinder pressure Pm and proceeds to step S80. The calculation of the converted stroke amount Sp will now be explained.

Figure 6:
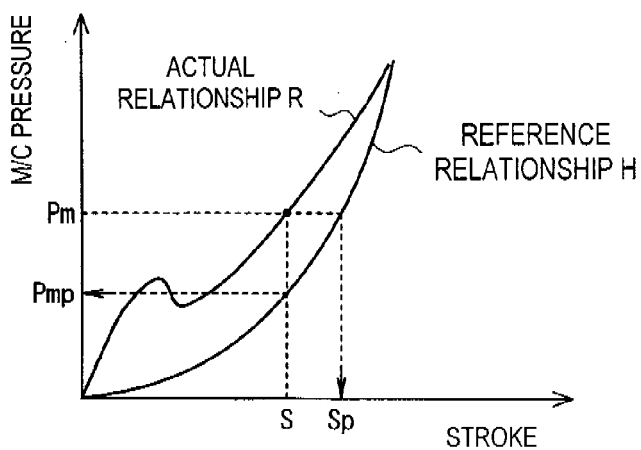
FIG. 6 is an exemplary graph for illustrating a reference relationship between the stroke and the master cylinder pressure and a method of calculating converted values of the stroke and the master cylinder pressure.

First, the relationship between the stroke amount S and the master cylinder pressure Pm that exists when the brake pedal 1 depressed very slowly is determined as a reference H (see FIG. 6). As the depression speed of the brake pedal 1 becomes faster, the value of the actual master cylinder pressure Pm becomes larger for a given stroke amount S. For example, as illustrated in FIG. 6, the master cylinder pressure obtained with the actual relationship R is larger than that obtained with the reference relationship H.

The actual master cylinder pressure Pm obtained from the pressure sensor 16 (i.e., the pressure value corresponding to the actual stroke) corresponds to a stroke amount S when the actual relationship R is used. The stroke amount S is then converted to a converted stroke amount Sp using the reference relationship H.

In step S80, a difference Ds (=Sp−S) is calculated and the BBW control unit 9B proceeds to step S90.

The difference Ds corresponds to the amount by which the actual response of the master cylinder pressure Pm to the depression of the brake pedal 1 (i.e., operation of the brake operating element) deviates from the response indicated by the reference relationship H.

As shown in FIG. 6, it is also acceptable to use the current stroke amount S with the reference relationship H to calculate a converted master cylinder pressure Pmp and use the difference (Pm−Pmp) between the actual master cylinder pressure Pm and the converted value Pmp as the difference Ds.

Figure 7:
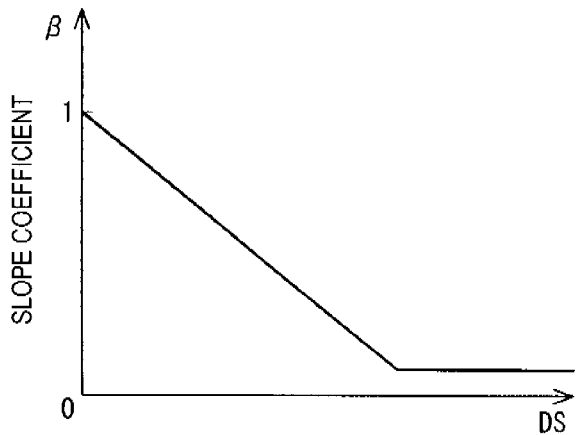
FIG. 7 is an exemplary graph for illustrating a relationship between a difference Ds and a slope coefficient.

In step S90, the BBW control unit 9B calculates a slope coefficient $\beta 1$ ($\leqq 1$) based on the difference Ds and proceeds to step S100. The slope coefficient $\beta 1$ is set to a value equal to or less than 1 in such a manner that the larger the difference Ds is, the smaller the slope coefficient $\beta 1$ becomes. For example, the coefficient $\beta 1$ can be determined using a map like that shown in FIG. 7. If the difference Ds will always larger than 1, it is acceptable to use the inverse of the difference Ds as the slope coefficient B1.

In step S100, the BBW control unit 9B suppresses (reduces) the braking force difference ΔF in accordance with the difference Ds by multiplying the braking force difference ΔF by the slope coefficient β1. As a result, the rotational speeds of the motor 7 and the pump 8 are suppressed such that the slope (rate) at which the pressure rises is suppressed.

$$\Delta F = \Delta F \times \beta 1$$

In step S110, the BBW control unit 9B calculates a control current Im for the motor 7 using the equation shown below based on the braking force difference ΔF and adjusts the current of the motor 7 to the control current Im. Then, the control sequence ends.

Figure 2:
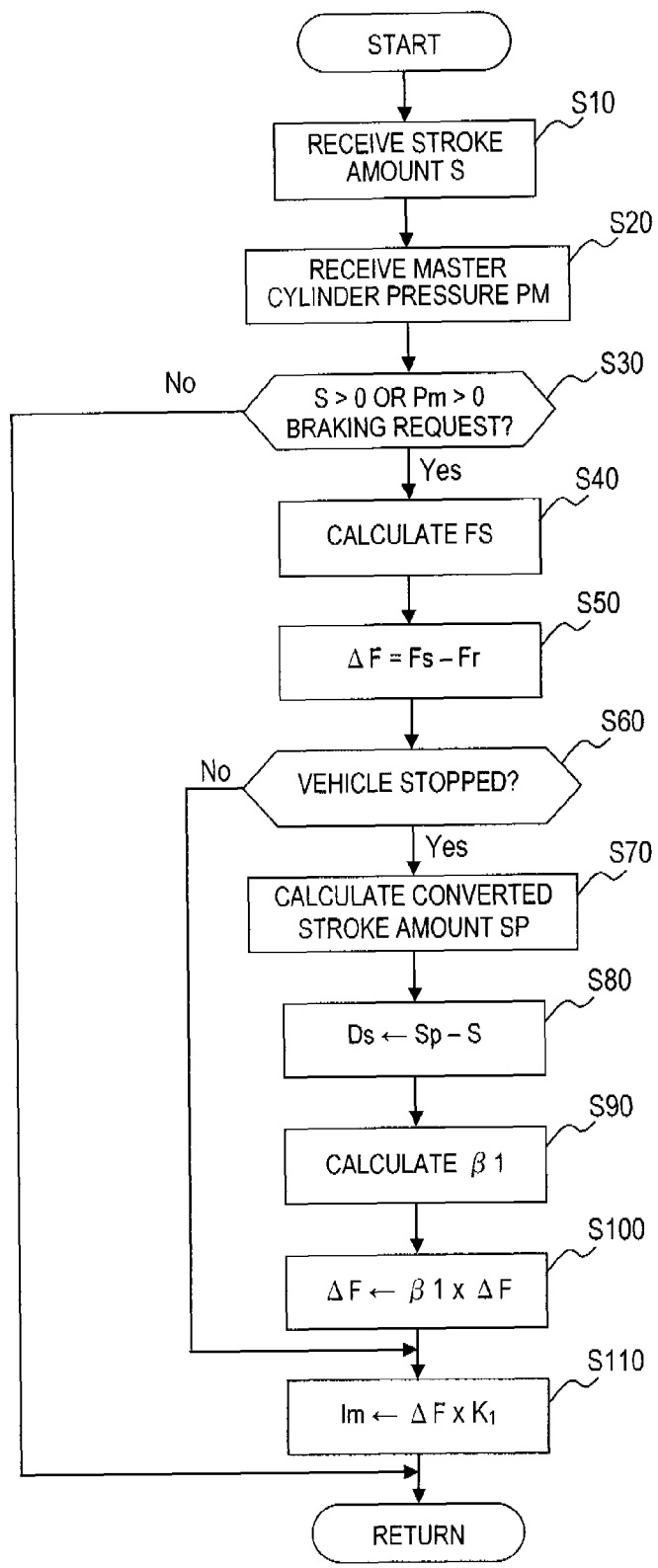
FIG. 2 is a flowchart of a brake control process executed in a brake-by-wire (BBW) controller or control unit of the vehicle braking apparatus in accordance with a first embodiment of the present invention.

The control sequence shown in FIG. 2 only shows the portion of the control flow during which the reduction valves 14 are closed, the holding valves 12 are opened, and the wheel cylinder pressure (braking force) is increased. When the wheel cylinder pressure is to be decreased, the holding valves 12 are closed and the reduction valves 14 are opened.

With a braking apparatus in accordance with the first embodiment, when it is estimated that the vehicle cabin background noise inside the vehicle cabin is equal to or below a prescribed threshold value, the rotational speed of the motor 7 is reduced by an amount corresponding to the difference Ds, which indicates the amount by which the response of the master cylinder pressure Pm to the stroke (depression amount of the brake pedal 1) differs from the response obtained based on a reference characteristic H. In other words, by lowering the rotational speed of the pump 8, the operating sounds of the motor 7 and the pump 8 are reduced and the comfort level inside the vehicle cabin is improved. Although this embodiment describes using the pump 8, it is also acceptable to connect to the wheel cylinders 4 with a wire instead of the pump 8.

Although the time required to reach the target braking force Fs becomes longer when the rotational speed of the motor 7 is decreased, this is not a problem because the vehicle is stopped or traveling at a very low speed.

Figure 9:
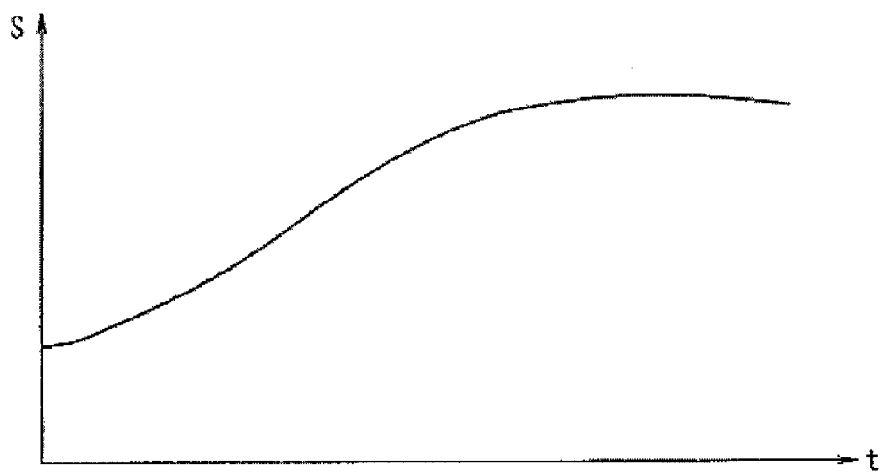
FIG. 9 shows a series of exemplary time charts for the vehicle braking apparatus in accordance with the first embodiment of the present invention.
Figure 9:
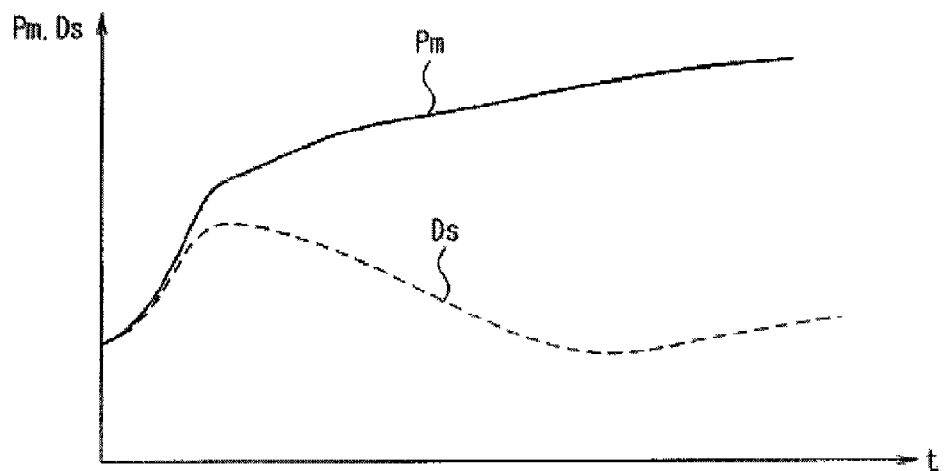
Figure 9:
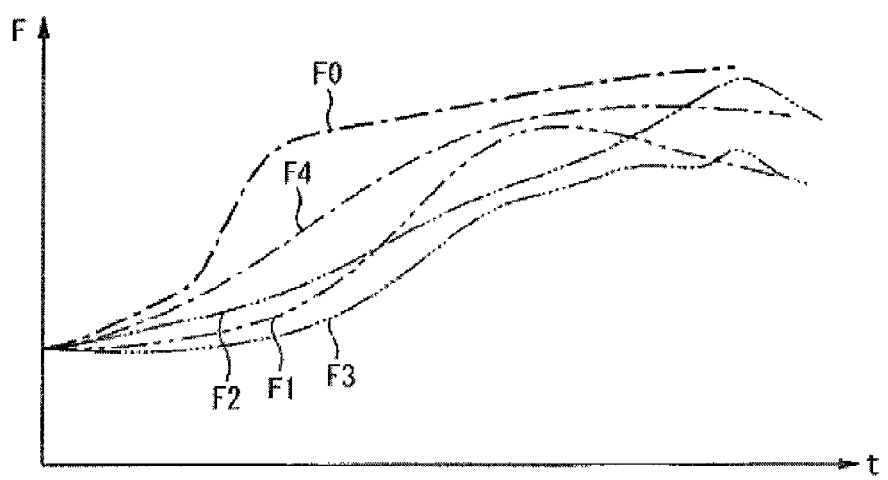

FIG. 9 shows time charts for the braking force and other quantities. Time plots for other embodiments (described later) are also included in FIG. 9. The time chart illustrates an example in which the target braking force Fs is calculated based on both the stroke amount S and the master cylinder Pm. Point F0 indicates the braking force obtained when the rotational speed of the motor 7 is not suppressed with the slope coefficient β1 (i.e., when β1=1). Point F1 indicates the braking force obtained when the rotational speed of the motor 7 is suppressed with the slope coefficient β1.

As shown in FIG. 9, the rotational speed of the motor 7, and thus, the rotational speed of the pump 8, is revised based on the difference between an actual response and a reference response of the operating element (input side of braking apparatus), the operation of which is used to calculate the target braking force Fs. As a result, during an initial stage of operation of the brake pedal 1, the rotational speed of the pump 8 is suppressed and the initial response (timing) is revised for the better.

Steps S70 to S100 constitute a change suppressing section of the braking controller 9.

A second embodiment will now be explained with reference to the drawings. Parts that are the same as the parts of the first embodiment are indicated with the same reference numerals. The basic constituent features of the second embodiment are the same as those of the first embodiment, except that the change rate suppressing section of the braking controller 9 is different. More specifically, the steps S70 to S100 of FIG. 2 or 8 executed by the BBW control unit 9B are replaced with the steps S265 to S300 shown in FIG. 10.

In step S265, the BBW control unit 9B acquires the discharge pressure of the pump 8 from the pressure sensor, and in step S270, the BBW control unit 9B calculates an estimated pump pressure Ps based on the target braking force Fs. Then, the BBW control unit 9B proceeds to step S280.

$$Ps = Fs \times K3$$, where K3 is a gain.

In step S280, the BBW control unit calculates the response delay amount ΔP of the pump 8 with respect to the target braking force Fs using the equation below and proceeds to step S290.

$$\Delta P = Ps - Pr$$

In step S290, the BBW control unit 9B calculates a slope coefficient β2 ($\leq 1$) based on the response delay amount ΔP and proceeds to step S300. The slope coefficient β2 is set to a value equal to or less than 1 in such a manner that the larger the response delay amount ΔP is, the smaller the slope coefficient β2 becomes. For example, the slope coefficient β2 is determined using a map like that shown in FIG. 7 (it is not necessary to use the same map as is used for β1). If the response delay amount ΔP will always larger than 1, it is acceptable to use the inverse of the amount ΔP as the slope coefficient B2.

In step S300, the BBW control unit 9B suppresses (reduces) the braking force difference AF by multiplying the braking force difference ΔF by the slope coefficient β2, as shown in the equation below. Then, the BBW control unit 9B proceeds to step S110.

$$\Delta F = \Delta F \times \beta 2$$

In step S110, the BBW control unit 9B calculates a control current Im for the motor 7 based on the braking force difference ΔF and adjusts the current of the motor 7 to the control current. Then, the control sequence ends.

In steps S265 to S280, the response delay amount (i.e., deviation—difference between the actual response and an estimated response) is calculated by converting the target braking force Fs into a pressure. It is also acceptable to calculate the response delay amount (i.e., deviation—difference between the actual response and the estimated response) based on a target braking force Fs estimated based on the discharge pressure of the pump 8 and an actual target braking force Fr.

With a braking apparatus in accordance with the second embodiment, when it is estimated that the vehicle cabin background noise inside the vehicle cabin is equal to or below a prescribed threshold value, the rotational speed of the motor 7 is reduced by an amount corresponding to the response delay amount ΔP of the braking force generating section (e.g., the motor 7 and the pump 8) with respect to the target braking force Fs. In other words, by lowering the rotational speed of the pump 8, the operating sounds of the motor 7 and the pump 8 are reduced and the comfort level inside the vehicle cabin is improved.

FIG. 9 shows time charts for the braking force and other quantities. The time chart illustrates an example in which the target braking force Fs is calculated based on both the stroke amount S and the master cylinder Pm. F0 indicates the braking force obtained when the rotational speed of the motor 7 is not suppressed with the slope coefficient β2 (i.e., when β2=1) and F2 indicates the braking force obtained when the rotational speed of the motor 7 is suppressed with the slope coefficient β2.

With the second embodiment, the rotational speed of the pump 8 is suppressed even more appropriately when the response difference of the braking force generating section with respect to the target braking force Fs is larger than the response difference of the operating element (input side of the braking apparatus) used in the first embodiment. In other words, the revision (suppression) of the rotational speed of the pump 8 is more optimized because the amount of time over which the revision is executed is longer and more continuous than in the first embodiment.

Figure 10:
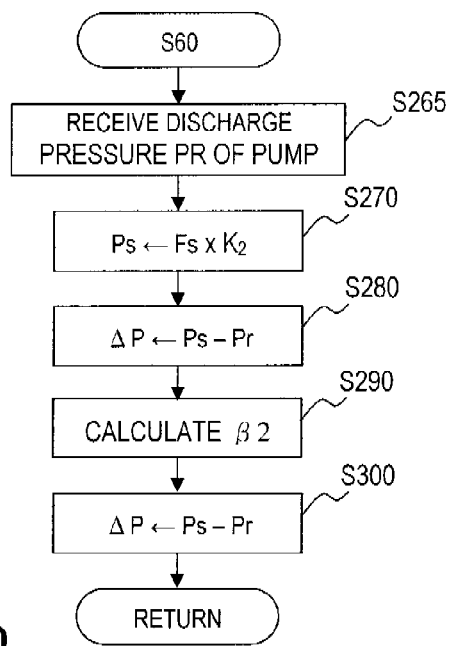
FIG. 10 is a flowchart of an alternative example a brake control process executed in the brake-by-wire (BBW) controller or control unit of the vehicle braking apparatus in accordance with a second embodiment of the present invention.

It is also acceptable to use both a slope coefficient β2 based on the response difference of the output side of the braking apparatus and a slope coefficient β1 based on the response difference of the input side of the braking apparatus in order to suppress the rotation of the motor 7. For example, the flowchart of FIG. 2 could be configured such that the steps S265 to S300 of FIG. 10 are executed immediately after step S100. As a result, the difference ΔF between the current braking force Fr and the target braking force Fs calculated in step S50 would be multiplied by both β1 and β2, as shown below.

$$\Delta F = \beta 1 \times \beta 2 \times \Delta F$$

In this case, the time chart of the braking force is as indicated with the curve F3 in FIG. 9. The rotational speed of the motor 7, i.e., the rotational speed of the pump 8, is suppressed based on both the response difference of the input side of the braking apparatus and the response difference of the output side of the braking apparatus. As a result, the response (good timing) of the revision executed by the first embodiment and the optimization (good continuity) of the revision executed by the second embodiment can both be obtained simultaneously, thus enabling the operating sounds to be reduced.

Figure 11:
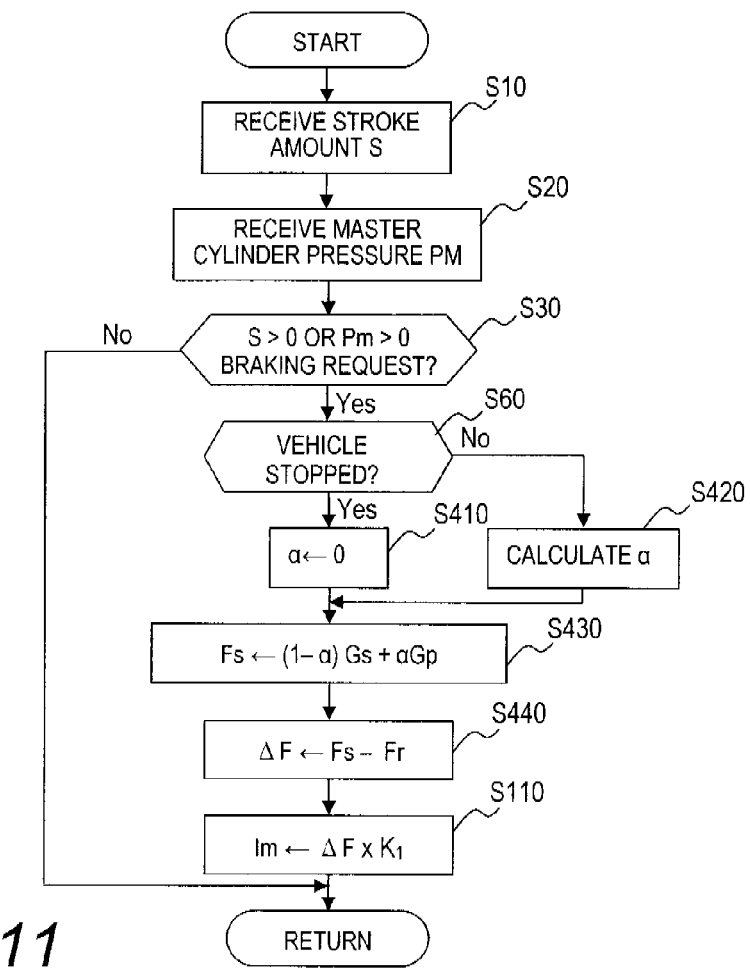
FIG. 11 is a flowchart of an alternative example a brake control process executed in the brake-by-wire (BBW) controller or control unit of the vehicle braking apparatus in accordance with a third embodiment of the present invention.

A third embodiment will now be explained with reference to the drawings. Parts that are the same as the parts of the first embodiment are indicated with the same reference numerals. The basic constituent features of the third embodiment are the same as those of the previous embodiments, except that the control processing steps executed by the BBW control unit 9B after step S30 of FIG. 2 (i.e., the steps constituting the change rate suppressing section) are different, as shown in FIG. 11.

Figure 13:
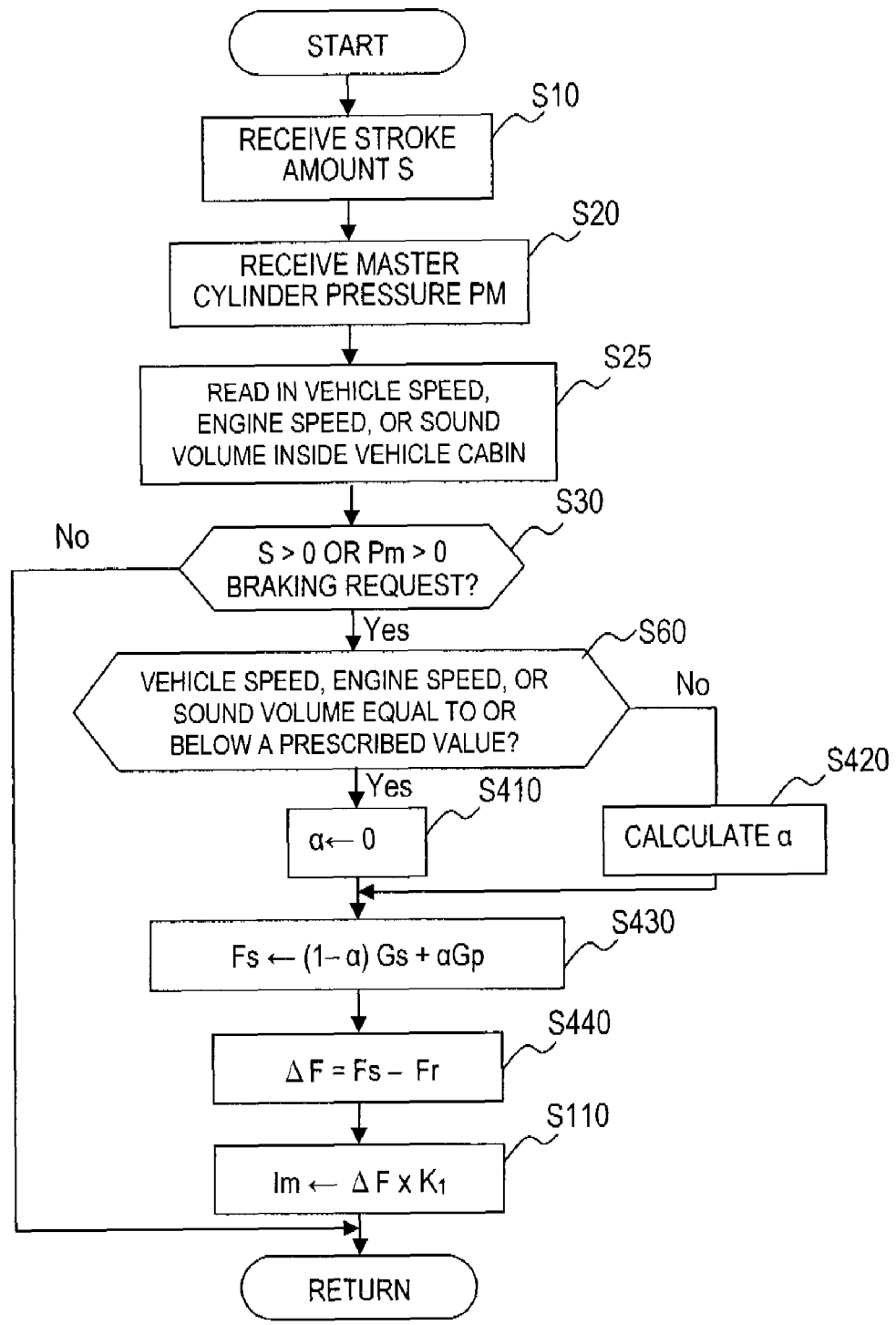
FIG. 13 is a flowchart of an alternative example a brake control process executed in the brake-by-wire (BBW) controller or control unit of the vehicle braking apparatus in accordance with the third embodiment of the present invention.

More specifically, if it determines in step S30 that there is a braking request, the BBW control unit 9B proceeds to step S60 and determines if the vehicle cabin background noise inside the vehicle cabin is equal to or below a prescribed threshold value due to the vehicle being stopped or the like. If the vehicle cabin background noise is equal to or below the prescribed threshold value, then the BBW control unit 9B proceeds to step S410 and sets a contribution coefficient α to 0. The BBW control unit 9B then proceeds to step S430. Similarly, to the alternative example (see FIG. 8) of the first embodiment described previously, the control sequence shown in FIG. 13 is employed when the vehicle speed, the engine speed, and/or the sound volume inside the vehicle cabin is detected to estimate if the vehicle cabin background noise inside the vehicle cabin is equal to or below a prescribed threshold value.

If it determines in step S30 that there is not a braking request, then the BBW control unit 9B proceeds to step S420.

In step S420, the BBW control unit 9B is configured to set the contribution coefficient α (0>α>1) as shown in FIG. 5 such that the larger the target braking force Fs (deceleration) of the previous cycle is, the larger the value of the contribution coefficient α becomes. Then, the BBW control unit 9B proceeds to step S430.

Figure 3:
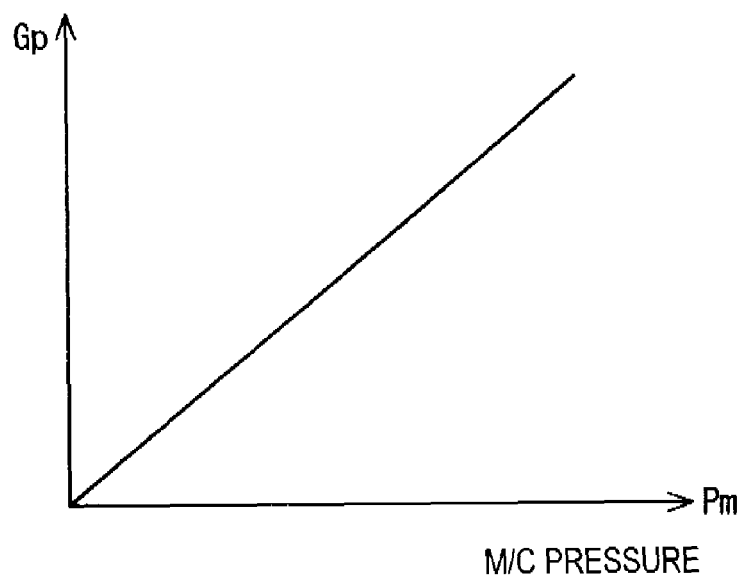
FIG. 3 is an exemplary graph for illustrating a relationship between the master cylinder pressure and the target braking force (target deceleration) in accordance with the first embodiment of the present invention.

In step S430, a prescribed gain K2 is multiplied by the master cylinder pressure Pm based on FIG. 3 in order to calculate a target braking force FsGp based on the master cylinder pressure Pm.

$$Gp = K2 \times Pm$$

Meanwhile, a target braking force Fs=Gs based on the stroke amount S is calculated using a graph map like that shown in FIG. 4.

Then, with the equation shown below, a final target braking force Fs is calculated based the master cylinder pressure Pm, the stroke amount S, and the contribution coefficient α. The contribution coefficient α sets the degree to which the master cylinder pressure Pm and the stroke amount S contribute to the calculation of the target braking force Fs.

$$Fs = G = (1-\alpha) \times Gs + \alpha Gp$$

In step S440, the BBW control unit 9B calculates the difference ΔF between the current braking force Fr and the target braking force Fs with the equation shown below and proceeds to step S110, where it calculates the control current Im for the motor 7.

$$\Delta F = Fs - Fr$$

As shown in FIG. 6, the master cylinder pressure Pm rises more rapidly when the brake pedal 1 is depressed more quickly. Conversely, when the vehicle cabin background noise inside the vehicle cabin is equal to or below a prescribed threshold value, the operating sound of the pump 8 during braking can be reduced by reducing the slope of the pressure rise characteristic, i.e., by reducing the rotational speed of the pump 8, because the target driving force Fs is calculated based on the stroke amount S of the brake pedal 1 alone.

The time chart of the braking force obtained with the third embodiment is indicated with the curve F4 in FIG. 9. As the time chart indicates, the slope of the pressure rise is smaller than for F0.

In the third embodiment, the contribution coefficient α is set to 0 in step S410, but the invention is not limited to such a setting. For example, it is also acceptable to reduce the contribution of the master cylinder pressure Pm in the calculation of the target braking force Fs by multiplying the contribution coefficient α calculated in step S420 by the slope coefficient explained in either the first embodiment or the second embodiment.

In the first and second embodiments, the difference ΔF between the current braking force Fr and the target braking force Fs is reduced using a slope coefficient β1 calculated based on a response difference of the input side of the braking apparatus, a slope coefficient β2 calculated based on a response difference (response delay amount) of the output side of the braking apparatus, or the combined slope coefficient β1×β2. However, the invention is not limited to these reduction methods. It is also acceptable to suppress the rotational speeds of the motor 7 and the pump 8 by calculating a slope coefficient β3 (<1) based on the amount of output delay of the pump 8 with respect to the stroke amount S of the brake pedal 1 and multiplying the difference ΔF by the slope coefficient β3.

Figure 12:
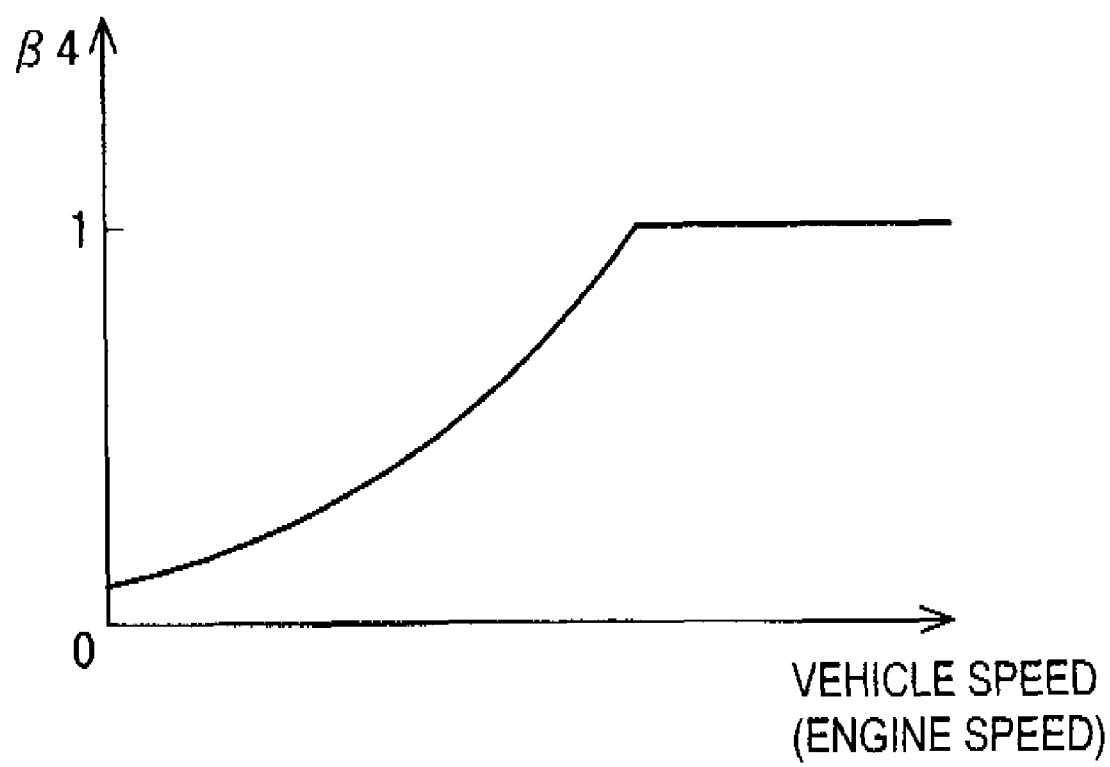
FIG. 12 is an exemplary graph for illustrating a slope coefficient β4 with respect to the vehicle speed or engine speed.

It is also acceptable to calculate a slope coefficient β4 that is smaller than 1 and becomes smaller as the vehicle speed or engine speed increases, as shown in FIG. 12, and multiply the difference ΔF between the current braking force Fr and the target braking force Fs by the slope coefficient β4 in order to suppress the rotational speeds of the motor 7 and the pump 8.

It is also acceptable to detect the sound inside the vehicle cabin and, when the vehicle cabin background noise inside the vehicle cabin is estimated to be equal to or below a prescribed threshold value, calculate a slope coefficient β4 based on the sound pressure of the sound such that the slope coefficient β4 is smaller than 1 and becomes smaller as the sound pressure decreases. The rotational speeds of the motor 7 and the pump 8 can then be suppressed by multiplying the difference ΔF between the current braking force Fr and the target braking force Fs by the slope coefficient β4.

It is also acceptable to install a sound detecting device to detect the sound pressure in the vicinity of the pump 8 and execute control to suppress the rotational speed of the motor 7 when the sound pressure in the vicinity of the pump 8 exceeds a prescribed threshold value.

The sound pressure (magnitude of sound) resulting from operation of a motor tends to increase as the rotational speed increases, but there is an extremely high peak frequency component does not occur. Meanwhile, the sound pressure resulting from the operation of the pump has a clear, sharp (thorn-shaped) peak frequency component in a rotational order component and it is believed that the peak at this particular frequency is the cause of an unpleasant sound (tone). Therefore, the invention can be worked effectively by calculating a motor rotational speed for which the sound pressure resulting from the operation of the pump does not reach an unpleasant level in advance and reducing the rotation of the motor to that rotational speed. For example, a motor rotational speed at which the sound pressure resulting from operation of the pump is substantially smaller than the sound pressure resulting from operation of the motor (i.e., a rotational speed at which the sound pressure of the pump is masked) can be used.

In the embodiments described heretofore, the motor and the pump are provided as an actuator or a braking force generating section. However, the invention is not limited to such a braking force generating section. It is also acceptable to apply the invention to an EMB braking apparatus in which the braking force is generated directly by an electric motor or other type of braking force actuator, which constitutes a braking force generating section. Also, although a gear pump is presented as an example of the hydraulic pump, it is also acceptable to use a plunger pump or other type of pump.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle braking apparatus comprising:
    a brake operating element configured and arranged to be operated by a driver of a vehicle;
    an actuator configured to generate a braking force in accordance with a braking operation of the brake operating element; and
    a controller operatively arranged to determine a reference pressure based on a relationship between a first stroke amount of the braking operating element and a first pressure generated in response to the first stroke amount, determine an actual pressure based on a relationship between a second stroke amount and a second pressure generated in response to the second stroke amount, the second pressure being greater than the first pressure, determine a difference between the actual pressure and the reference pressure, determine a coefficient based on the difference, modify a difference between the braking force and a target braking force based on the coefficient to produce a modified braking force difference, and control the actuator based on the modified braking force difference to suppress an increase in a rate of change of a braking force with respect to the braking operation by the driver as a depression speed of a brake pedal by the driver becomes faster upon determining that vehicle cabin background noise is equal to or below a prescribed threshold value and that the vehicle is traveling at a low vehicle traveling speed equal to or below a prescribed speed threshold value.

2. The vehicle braking apparatus as recited in claim 1, wherein
    the controller is further configured to determine that the vehicle cabin background noise is equal to or below the prescribed threshold value upon determining that a sound level inside the vehicle cabin is equal to or below the prescribed threshold value.

3. The vehicle braking apparatus as recited in claim 1, wherein
    the actuator includes a pump arranged and configured to deliver fluid pressure to a brake cylinder, the controller being further configured to set the prescribed threshold value as a variable value such that as sound from the pump becomes larger, the prescribed threshold value becomes larger.

4. The vehicle braking apparatus as recited in claim 1, wherein
the controller is further configured to set the prescribed threshold value as a variable value such that as sound from the actuator becomes larger, the prescribed threshold value becomes larger.

5. The vehicle braking apparatus as recited in claim 3, wherein
the controller is further configured to suppress the rate of change of the braking force by the actuator in accordance with a response delay of an output of the pump with respect to the braking operation of the brake operating element.

6. The vehicle braking apparatus as recited in claim 1, wherein
the controller is configured to control the actuator to suppress the rate of change of the braking force by suppressing a rotational speed of the actuator in accordance with the modified braking force difference.

7. The vehicle braking apparatus as recited in claim 1, wherein
the controller is further configured to reduce a degree of contribution of the actuator in a calculation of the target braking force when the controller estimates that the vehicle cabin background noise in the vehicle cabin is equal to or below the prescribed threshold value.

8. The vehicle braking apparatus as recited in claim 1, wherein
the controller is further configured to determine when the vehicle cabin background noise in the vehicle cabin is equal to or below the prescribed threshold value based upon a vehicle speed being equal to or below a prescribed vehicle speed.

9. The vehicle braking apparatus as recited in claim 1, wherein
the controller is further configured to determine when the vehicle cabin background noise in the vehicle cabin is equal to or below the prescribed threshold value based upon an engine speed being equal to or below a prescribed rotational speed.

10. The vehicle braking apparatus as recited in claim 2, wherein
the actuator includes a pump arranged and configured to deliver fluid pressure to a brake cylinder,
the controller being further configured to set the prescribed threshold value as a variable value such that as sound from the pump becomes larger, the prescribed threshold value becomes larger.

11. The vehicle braking apparatus as recited in claim 2, wherein
the controller is further configured to set the prescribed threshold value as a variable value such that as sound from the actuator becomes larger, the prescribed threshold value becomes larger.

12. The vehicle braking apparatus as recited in claim 11, wherein
the controller is further configured to suppress the rate of change of the braking force by suppressing a rotational speed of the actuator in accordance with a response delay of an output of the pump with respect to the braking operation of the brake operating element.

13. The vehicle braking apparatus as recited in claim 2, wherein the controller is further configured to reduce a degree of contribution of the actuator in a calculation of the target braking force when the controller estimates that the vehicle cabin background noise in the vehicle cabin is equal to or below the prescribed threshold value.

14. The vehicle braking apparatus as recited in claim 2, wherein
the controller is further configured to determine when the vehicle cabin background noise in the vehicle cabin is equal to or below the prescribed threshold value based upon a vehicle speed being equal to or below a prescribed vehicle speed.

15. The vehicle braking apparatus as recited in claim 2, wherein
the controller is further configured to determine when the vehicle cabin background noise in the vehicle cabin is equal to or below the prescribed threshold value based upon an engine speed being equal to or below a prescribed rotational speed.

16. A vehicle braking apparatus comprising:
driver operable brake means for performing a braking operation by a driver of a vehicle;
actuating means for generating a braking force in accordance with the braking operation of the driver operable brake means; and
control means for determining a reference pressure based on a relationship between a first stroke amount of the braking operating element and a first pressure generated in response to the first stroke amount, determining an actual pressure based on a relationship between a second stroke amount and a second pressure generated in response to the second stroke amount, the second pressure being greater than the first pressure, determining a difference between the actual pressure and the reference pressure, determining a coefficient based on the difference, modifying a difference between the braking force and a target braking force based on the coefficient to produce a modified braking force difference, and controlling the actuating means based on the modified braking force difference to suppress an increase in a rate of change of the braking force with respect to the braking operation by the driver as a depression speed of a brake pedal by the driver becomes faster upon determining that vehicle cabin background noise is equal to or below a prescribed threshold value and that the vehicle is traveling at a low vehicle traveling speed equal to or below a prescribed speed threshold value.

17. A vehicle braking apparatus comprising:
a brake operating element configured and arranged to be operated by a driver;
an actuator configured to generate a braking force in accordance with a braking operation of the brake operating element; and
a controller operatively arranged to determine a reference pressure based on a relationship between a first stroke amount of the braking operating element and a first pressure generated in response to the first stroke amount, determine an actual pressure based on a relationship between a second stroke amount and a second pressure generated in response to the second stroke amount, the second pressure being greater than the first pressure, determine a difference between the actual pressure and the reference pressure, determine a coefficient based on the difference, modify a difference between the braking force and a target braking force based on the coefficient to produce a modified braking force difference, and control the actuator based on the modified braking force difference to suppress an increase in a rate of change of the braking force as a depression speed of a brake pedal by the driver becomes faster upon determining that vehicle cabin background noise is equal to or below a threshold value and that the vehicle is traveling at a low vehicle traveling speed equal to or below a prescribed speed threshold value.

18. A vehicle braking method comprising:

determining a braking operation by a driver of a vehicle;

determining if vehicle cabin background noise is equal to or below a prescribed threshold value;

determining a reference pressure based on a relationship between a first stroke amount of the braking operating element and a first pressure generated in response to the first stroke amount;

determining an actual pressure based on a relationship between a second stroke amount and a second pressure generated in response to the second stroke amount, the second pressure being greater than the first pressure;

determining a difference between the actual pressure and the reference pressure;

determining a coefficient based on the difference;

modifying a difference between the braking force and a target braking force based on the coefficient to produce a modified braking force difference; and controlling an actuator used to achieve a target braking force based on the modified braking force difference to suppress an increase in a rate of change of a braking force with respect to the braking operation by the driver as a depression speed of a brake pedal by the driver becomes faster when the vehicle cabin background noise is determined to be equal to or below a prescribed threshold value and that the vehicle is traveling at a low vehicle traveling speed equal to or below a prescribed speed threshold value.

19. The vehicle braking apparatus as recited in claim 17, wherein the controller is further configured to suppress the rate of change of the braking force by the actuator in accordance with a response delay of an output of the braking force with respect to the braking operation of the brake operating element.

* * * * *